Patented Sept. 21, 1954

2,689,795

UNITED STATES PATENT OFFICE 2,689,795

COFFEE ROASTING

Sahny Olenikov, New York, N. Y.

No Drawing. Application July 15, 1949,
Serial No. 105,049

5 Claims. (Cl. 99—68)

My invention relates to the processing of foodstuffs and includes among its objects and advantages an improved roasting process particularly applicable to coffee and similar agricultural products.

In the case of coffee, the time-honored roasting process amounts to heating the green berries and then cooling them again. Thereafter the cold roasted berry is ground and the ground particles are extracted with hot water to prepare a beverage. The time-temperature history of the berry during the heating and cooling has a decided effect, not only on the loss of weight of the berry, but on the quality and quantity of potable beverage obtainable from the roasted product. The loss of weight is, presumably, due to volatilization, but what ingredients of the berry, other than water, are thus driven off, changed or destroyed, is an open and perplexing question.

So far as I am aware, while a wide variety of expedients for applying the heat and a wide variety of rates of heating and cooling have been practiced, the substantially universal practice involves a roasting that reduces the weight of the charge by about 15%. Knowledge of this characteristic of the customary process dates back at least to 1871 as shown in Patent 119,959 to Ashcroft, October 17, 1871, which states that from 12 to 20% is generally lost in roasting.

Any suitable conventional roasting equipment is adaptable to practicing and securing the advantages of the invention herein disclosed, such, for instance, as the roaster disclosed in Burns 2,129,673 of September 13, 1938.

I have discovered that by performing the roasting in the presence of an effective quantity of a catalyst, the roasting can be performed more quickly and with somewhat less immediate loss of weight. Furthermore, when the roasting is thus performed, it is possible to restore the weight of the finished material to its original value by the addition of water, and the resulting material still has good texture and the improved flavor resulting from roasting in the presence of such a catalyst. This is not what might have been expected, because it is common knowledge in this art that restoration of weight by restoring water to coffee roasted in the ordinary way materially impairs the mechanical and keeping properties of the material and injures the flavor.

One catalyst with which I have secured the advantages of the invention, is activated carbon. However, the form of the invention preferred at the present time employs larger quantities of carbon possessing catalytic power to a lesser degree, as in the following example.

Example I 100 parts by weight of clean green coffee berries are mixed with 50 parts by weight of ordinary coke, in lumps having dimensions from ⅛ inch up to one inch, and substantially devoid of fines. The resulting mass is placed in a roaster and heat is supplied in the usual way. The progress of the roasting, as is customary in this art, is observed by eye and by the sense of smell. With such carbon present, a roast that would otherwise take from 15 to 21 minutes may be completed in about nine minutes, and the ordinary eye and smell of one of ordinary skill in the art is effective to determine when to stop the roasting. With most grades of coffee, a skilled roaster, after experience in practicing the invention, can detect a difference in the color and glaze and texture of the roasted berry.

It remains to cool the berry fairly fast because it is well known in the art that a very slow cooling prolongs the chemical reactions incident to roasting beyond the desired end point. Such slow cooling also seriously impairs the flavor. I believe the reason for this to be that certain of the flavor ingredients undergo slow and deleterious chemical reactions at various temperatures between the maximum temperature of the roast and room temperature, and the longer it takes to return to room temperature, the more of these undesirable reactions occur. In any event, it is common practice in the art to cool with fair rapidity.

According to the invention, while the advantages of the invention can be obtained to a significant degree by an effective blast of cold air, and I have secured materially improved results by spraying into the hot mass as much as six parts by weight of cold water. A material fraction of this water is volatilized and may go off in the form of steam, but of course some of it will be taken up by the berries.

After the berries have been cooled rapidly, at least below about 100° F., they may be ground in the usual way at room temperature and after grinding, enough additional water is added to the charge to restore the original weight.

Example II

Instead of cold water I have been able to employ about the same weight of finely cracked ice. This increases by about 20% the amount of thermal units the coolant takes out of the mass, and appears to secure results still a little better than those with cold water.

Example III

In lieu of coke activated carbon may be made up into pellets or incorporated by enclosing it in perforated containers, with closely similar results. However, the cost of the activated carbon becomes a material item of expense.

Example IV

The green coffee is ground into fragments and the roasting carried out as in any of the preceding examples. This speeds up the roasting, but not in direct proportion to the reduction in size because it is necessary to avoid local overheating of individual particles.

I believe the superior results of procedure according to the invention to be due primarily to two factors. First, the catalytic action at the surface of the catalyst alters the chemical reactions of the volatile or semi-volatile substances present, particularly those having to do with flavor and aroma. I know of no other way to account for the improvement in flavor resulting from the practice of the invention. Second, coke is a material of lower specific heat and much higher thermal conductivity than the berries with which it is mixed. Therefore it readily absorbs radiant heat from any heating source, as well as the sensible heat of the lining of the roaster by conduction. Thus it is quickly warmed during the time that the temperature is rising, to a materially higher temperature than the berries, and the individual pieces of coke bear against the berries as the charge is tumbled, resulting in transfer of heat by direct conduction to the berry as well as a slight mechanical massaging of the material of the berry at the point of contact.

Others may readily adapt the invention for use under various conditions of service by employing one or more of the novel features involved, or equivalents thereof. For instance, ordinary charcoal made from hardwood seems to be about as effective as coke. When it is used without mechanical protection for the lumps, the finished coffee has a very thin black film adhering to each bean, which film may or may not be desirable. Various other catalysts may be used. Metallic copper and platinum sponge have been tried in combination with coke and appear to add to the effectiveness of the action. Granular nickel has been used and produces a distinctive aroma. Any of these catalysts might be made up to constitute part or all of the holder or container supporting the beans during roasting. The use of a plurality of catalysts in combination frequently results in one catalyst functioning as a promoter for the other.

Either the coffee or the catalyst may be preheated to various degrees before they are put in juxtaposition. After the roast is finished other catalysts may be added to the hot coffee at the beginning of or during the cooling process.

To the best of my knowledge and belief, the ordinary roasting of coffee does not produce chemical changes in the substance of the berry to form appreciable amounts of uncombined carbon from the material of the berry itself. Whether this is correct or not, any such newly formed carbon is within the berry and not extensively exposed where it could affect the vapors present. Furthermore, it would only be formed toward the end of the roasting process so that nearly all the roasting and vapor-liberation, in any event, take place in the absence of such carbon. The presence of extraneous carbon catalyst exposed directly to the gases present substantially throughout the roast, appears to be intimately connected with the unique and novel advantages secured by my process.

As at present advised with respect to the apparent scope of my invention, I desire to claim the following subject matter:

1. The method of roasting coffee which comprises: raising the temperature in the presence of an extraneous carbon catalyst; chilling the hot beans with cracked ice; grinding the roasted beans; separating the catalyst from the beans after application of heat is ended and before grinding; and restoring the ground mass to its original weight prior to roasting.

2. The method of roasting coffee which comprises: raising the temperature in the presence of a catalyst comprising carbon in the form of coke; chilling the hot beans; grinding the roasted beans; and separating the catalyst from the beans after application of heat is ended and before grinding.

3. The method of roasting coffee which comprises: raising the temperature in the presence of an extraneous catalyst comprising carbon; chilling the hot beans; grinding the roasted beans; and separating the catalyst from the beans after application of heat is ended and before grinding.

4. A method of roasting coffee which comprises conducting a conventional roasting operation in the presence of an admixed catalyst consisting of carbon, extraneous to the coffee berries themselves and acting primarily on the vapors present.

5. The method of roasting coffee which comprises: dispersing throughout the green coffee an extraneous carbonaceous catalyst having affinity for vapors; said catalyst being in segregated masses capable of remaining segregated during the roast; raising the temperature of the mixed mass by conventional means; chilling the hot whole beans; grinding the roasted and cooled beans; increasing the mass to a total not exceeding the original total by the addition of water; adding part of said water as part of the chilling of the hot beans; and separating the segregated catalyst from the beans after the application of heat is ended and before grinding.

References Cited in the file of this patent

UNITED STATES PATENTS

| Number | Name | Date |
|---|---|---|
| 1,850,971 | Rosenfield | Mar. 22, 1932 |
| 1,946,398 | Gilbreath | Feb. 6, 1934 |
| 2,017,892 | Clary | Oct. 22, 1935 |

FOREIGN PATENTS

| Number | Country | Date |
|---|---|---|
| 3,129 | Great Britain | of 1901 |
| 27,036 | Great Britain | of 1907 |